Dec. 27, 1927.
A. W. GRAY
1,653,957
POTATO AGITATOR
Filed July 5, 1927  2 Sheets-Sheet 1
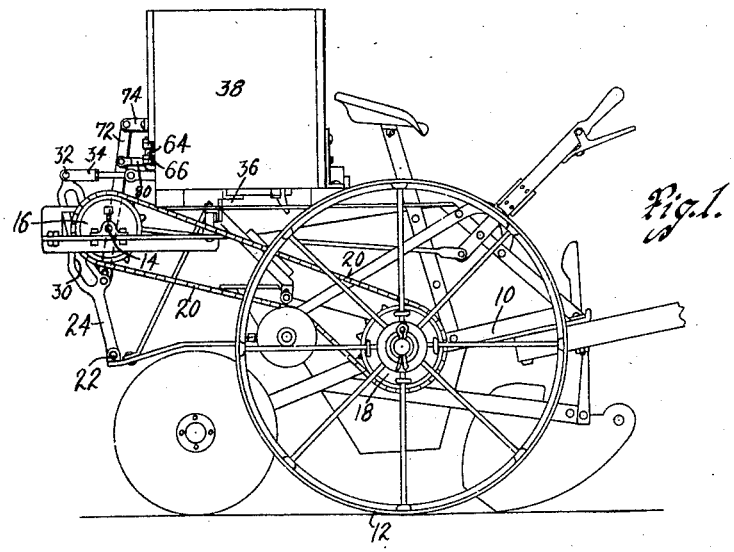
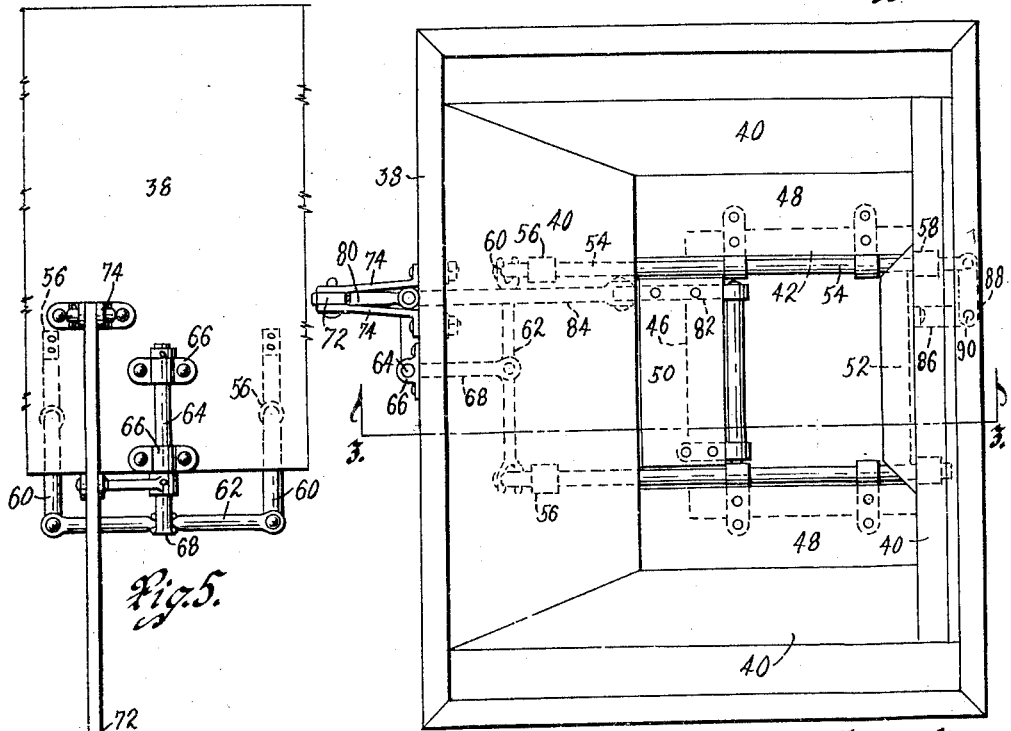
Witness
L. F. Sandberg
Inventor
Albert W. Gray
by Bair & Freeman Attorneys

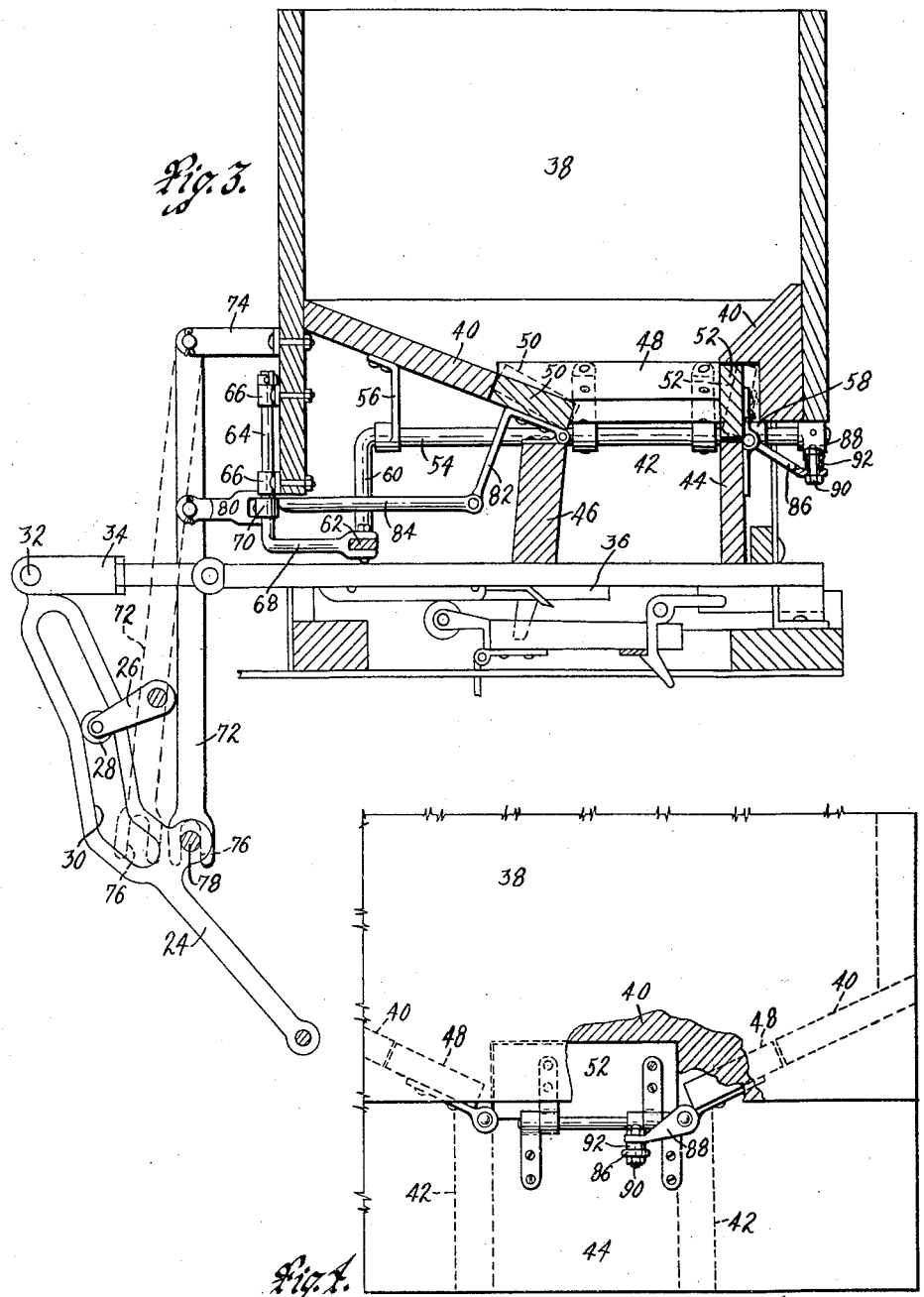

Patented Dec. 27, 1927.

1,653,957

UNITED STATES PATENT OFFICE.

ALBERT W. GRAY, OF ELDORA, IOWA.

POTATO AGITATOR.

Application filed July 5, 1927. Serial No. 203,300.

The object of my invention is to provide a potato agitator adapted to be built into the seed potato hopper of a potato cutting device, the device itself being installed on a potato planter. My present invention is an improvement over the agitator shown in my Patent No. 1,606,567 issued November 9, 1926.

A further object of my present invention is to provide such an agitator of simple, durable, and comparatively inexpensive construction.

Still a further object is to provide the seed potato hopper with an opening in the bottom thereof and agitator wings around this opening for the purpose of agitating the seed potatoes and causing them to fall through the opening onto the cutting mechanism forming a part of the patent just referred to.

Still a further object is to provide a novel arrangement for operatively connecting the various agitator wings together whereby they may all be driven from a single lever.

Still a further object is to provide one of the agitator wings mounted in a substantially vertical position whereby it has the effect of forcing the potatoes down to the cutting mechanism as well as agitating them.

With these and other objects in view, my invention consists in the construction, arrangement and combination of the various parts of my potato agitator, whereby the objects contemplated are attained, as hereinafter more fully set forth, pointed out in my claims, and illustrated in the accompanying drawings, in which:

Figure 1 illustrates a side elevation of a potato planter showing the seed potato hopper mounted thereon, my improved agitating device being included in the hopper.

Figure 2 is a plan view of the potato hopper showing the agitators mounted thereon.

Figure 3 is a sectional view through the hopper on the line 3—3 of Figure 2.

Figure 4 is a front end elevation of a portion of the hopper, parts being broken away and other parts being shown in section; and Figure 5 is a rear end elevation of a portion of the seed potato hopper.

On the accompanying drawings I have used the reference numeral 10 to indicate generally a potato planter. The potato planter 10 is provided with supporting wheels 12 which provide power for operating a potato cutting mechanism as well as my improved agitator device as the potato planter is propelled over the ground.

A crank shaft 14 is journaled in bearings on the frame of the potato planter and is driven through the medium of a sprocket 16 thereon. A sprocket 18 is secured to the potato planter wheel 12. The sprockets 16 and 18 are operatively connected together by a chain 20 whereby the crank shaft 14 will be rotated upon rotation of the potato planter wheels 12.

Pivoted at 22 to the frame of the potato planter 10 is a slotted arm 24. The arm 24 is adapted to swing on the pivot bolt 22. Such swinging movement is imparted to the arm 24 by a crank arm 26 secured to the crank shaft 14. The crank arm 26 has journaled thereon a roller 28 adapted to travel in a groove 30 formed in the arm 24. It will be obvious that rotation of the crank arm 26 will cause the roller 28 to move up and down in the slot 30 and in so doing the arm 24 will be oscillated.

Pivotally secured at 32 to the upper end of the arm 24 is a link 34. The link 34 is pivoted to a seed potato cutting mechanism 36 which is described in my prior patent hereinbefore mentioned. As the cutting mechanism 36 forms no part of my present invention I will not further describe it.

A seed potato hopper 38 is mounted on the frame of the potato planter 10 and comprises four sides and bottom members 40. The bottom members 40 extend inwardly just far enough to leave an opening in the bottom of the hopper 38 of substantially large dimensions. A chute comprising sides 42 and a front and back 44 and 46 is positioned below the hopper 38 and above the cutting mechanism 36 whereby seed potatoes entering the chute from the hopper will be directed onto the cutting knives of the cutting mechanism 36.

The chute is substantially smaller than the opening formed by the inner edges of the members 40 of the hopper and spanning the distance between the opening through the chute and the inner edges of the members 40 are a plurality of agitator wings 48, 50, and 52. The wings 48, 50, and 52 are adapted to agitate the seed potatoes contained in the hopper 38 while the potato planter is in motion whereby the potatoes will be properly moved to drop into the chute and onto the cutting mechanism 36.

The wings 48 are secured to rock shafts 54. The rock shafts 54 are journaled in bearings 56 and 58 supported beneath the bottom members 40 of the hopper. The rock shafts 54 are formed with downwardly extending crank arms 60 which are operatively connected together by a link 62. It will be obvious that longitudinal reciprocation of the link 62 will swing the crank arms 60 and consequently oscillate the agitator wings 48.

For causing such reciprocation of the link 62 I provide a bell crank 64 journaled on the bearings 66 secured to the back side of the potato hopper 38. The bell crank 64 is provided with a pair of arms having the reference numerals 68 and 70. The arm 68 is pivoted to the link 62 intermediate its length whereby oscillation of the bell crank will reciprocate the link.

For causing such oscillation of the bell crank 64 I provide a lever 72. The lever 72 is pivoted to a bracket 74 secured to the back side of the hopper 38 and its lower end is formed with a slot 76 adapted to coact with a pin 78. The pin 78 is supported on the arm 24. Swinging movement of the arm 24 will cause corresponding swinging movement of the lever 72 as for instance to the dotted line position illustrated in Figure 3 of the drawings.

The lever 72 is connected by a link 80 to the arm 70 whereby this swinging movement will be imparted to the arm 70 of the bell crank 64 and the agitator wings 48 will be oscillated when the potato planter is operated.

The agitator wing 50 is hinged to the back 46 of the chute between the hopper and the potato cutting mechanism and has secured to it an arm 82. The lower end of the arm 82 is operatively connected by a link 84 to the link 80 and arm 70 whereby the agitator wing 50 is oscillated when the lever 72 is swung.

The agitator wing 52 is hinged to the front member 44 of the chute and is provided with an arm 86. An arm 88 is secured to one of the rock shafts 54 and its free end extends over the free end of the arm 86. The free ends of the arms 86 and 88 are operatively connected together by a bolt 90 or the like. The connection just described must be universal and the openings in the arms 86 and 88 therefrom are formed larger than the bolt 90. A washer 92 is positioned between the arms. This provides a loose or universal connection between the arms 86 and 88 so that no binding of the parts occurs during operation of the device.

I have found that the agitator just described works much better than the one which I had shown in my former patent and insures that the seed potatoes will be correctly fed through the chute and onto the cutting mechanism 36. The device operates entirely satisfactorily in conjunction with a potato planter.

It will be obvious from the foregoing specification that I have provided a hopper with a plurality of agitator wings therein and have operatively connected the wings together in a simple manner whereby complication of mechanical operating parts is eliminated.

Some changes may be made in the details of the structure and arrangement of the various parts of my potato agitator and it is my purpose and intent to cover by my claims any such changes or any use of mechanical equivalents, which may be reasonably included within their scope.

I claim as my invention:

1. A device of the character described comprising a hopper, hinged wings in the bottom thereof, two of said wings having crank arms associated therewith, a link connection between the free ends of said crank arms, a bell crank having an arm pivoted to said link intermediate its length whereby oscillation imparted to the other arm of said bell crank will oscillate said wings, another crank arm associated with another of said wings and a link connection between said last mentioned crank arm and said other arm of said bell crank.

2. A device of the character described comprising a hopper, hinged wings in the bottom thereof, two of said wings having crank arms associated therewith, a link connection between the free ends of said crank arms, a bell crank having an arm pivoted to said link intermediate its length whereby oscillation imparted to the other arm of said bell crank will oscillate said wings, another crank arm associated with another of said wings, a link connection between said last mentioned crank arm and said other arm of said bell crank, a rock arm associated with the remaining wing and a coacting rock arm associated with one of the first mentioned wings whereby its oscillation is transmitted to the remaining wing.

3. A device of the character described comprising a hopper, hinged wings in the bottom thereof, two of said wings having crank arms associated therewith, a link connection between the free ends of said crank arms, a bell crank having an arm pivoted to said link intermediate its length whereby oscillation imparted to the other arm of said bell crank will oscillate said wings, a rock arm associated with another of said wings and a coacting rock arm associated with one of the first mentioned wings whereby its oscillation is transmitted to said last mentioned wing.

4. In a device of the character described, a pair of shafts, arms on said shafts, a link connecting the free ends of said arms together, a bell crank having one of its arms pivoted to said link, a pair of cross shafts between said first pair of shafts, one shaft of said last pair, being operatively connected to one of said first mentioned shafts and the other one having a link connection with the other arm of said bell crank whereby both pairs of shafts are oscillated simultaneously with said bell crank and agitator wings secured to said shafts.

5. In a device of the character described, a pair of shafts, arms on said shafts, a link connecting the free ends of said arms together, a bell crank having one of its arms pivoted to said link, a pair of cross shafts between said first pair of shafts, one shaft of said last pair having an arm thereon, one of said first mentioned shafts having an arm thereon, a universal connection between the free ends of said arms whereby the shafts so connected are oscillated simultaneously with said bell crank and agitator wings secured to said shafts.

ALBERT W. GRAY.